Feb. 13, 1968 KATSUYA ATSUMI 3,369,081

MECHANO-ELECTRIC ELIMINATION OF RESIDUAL MAGNETIZATION IN A MULTI-TRACK RECORDER UTILIZING A SEPARATE BIAS HEAD

Filed March 11, 1964 3 Sheets-Sheet 1

INVENTOR.
KATSUYA ATSUMI
BY Eyre, Mann & Lucas

INVENTOR.
KATSUYA ATSUMI
BY Eyre, Mann & Lucas

INVENTOR.
KATSUYA ATSUMI
BY Eyre, Mann & Lucas

United States Patent Office 3,369,081

Patented Feb. 13, 1968

3,369,081

MECHANO-ELECTRIC ELIMINATION OF RESIDUAL MAGNETIZATION IN A MULTI-TRACK RECORDER UTILIZING A SEPARATE BIAS HEAD

Katsuya Atsumi, Tokyo, Japan, assignor to Akai Electric Co., Ltd., Tokyo, Japan, a corporation of Japan Filed Mar. 11, 1964, Ser. No. 351,150
9 Claims. (Cl. 179—100.2)

ABSTRACT OF THE DISCLOSURE

The invention herein below described is basically a tape recorder head arrangement comprising an erase head, multi-track audio current head and bias head, the bias head being able to pivot with respect to the audio current head. Pivotal movement of the bias head is supplied by a mechanically operated slide bar with an extension attached thereto which permits relative slidable movement between the extension and a cooperating surface on the bias head, said slidable movement being converted into pivotal movement of the bias head. Part of the pivotal movement of the bias head is accomplished while the bias head is still energized, thereby subjecting the audio current head to a diminishing intensity, high-frequency magnetic field which in effect erases residual magnetism from the core of the audio current head.

This invention relates to improvements in and relating to magnetic head arrangements of magnetic tape recording and reproducing machines, hereinafter briefly called "the tape recorder" or still more briefly "the machine."

It has been already proposed to separate the conventionally employed combined audio-signal and H.F. biasing head into two respective head units so as to obtain optimal magnetic operating conditions for the both. It is further known to arrange these two separated head units at an opposed, yet slightly separated relation to and from each other.

With use of such conventional head arrangements, wherein said both head units are kept in a fixedly opposite, yet slightly separated position, considerable trouble has been encountered in that an audio-signal head such as the record head is left in its residually energized condition upon completion of a record operation. The problem of residual energization is also found in the combined and unified record and biasing head. This residual energization, when accumulated, leads, as commonly known to those skilled in the art, to considerable noise during play-back operation from a recorded magnetic tape. For magnetically erasing such residual magnetization within the record or play-back heads, so-called head erasers in the form of portable units have been sold on the market. Thus, an operator of the tape recorder must keep such a unit always at his side. When it is desired to carry out the erasure in the above-mentioned sense, the operator must use the portable unit. Such an additional and troublesome procedure is also highly disadvantageous.

As an alternative measure for realizing the erasure of residual magnetization, it has already been proposed to provide an additional circuit employing an earthed condenser for the erasure of residual head magnetization upon completion of a recording operation. Provision of such an additional circuit gives rise to complication of the electronic circuit arrangement of the machine, and also increases the production costs thereof.

It is therefore the main object of the invention to provide an improved and unique magnetic head arrangement of the tape recorder, wherein the biasing head may well serve as a residual magnetization eraser in a manner substantially similar to that of an erasing magnetic head.

For this purpose, the biasing head is arranged to be capable of pivoting between its cooperating position with the conventional stationary audio-signal head and its receded off-service position. Electric switch means is related to the pivoting mechanism so as to provide a time lag for the shut-off of the current supply to the biasing head, such time lag being counted from the initiation of each returning or receding movement of the head to its initial or off-service position, while the audio-signal head is shut-off instantly. In this way, the biasing head may positively function in this case as an erasing head.

It is another object of the invention to provide an improved head arrangement of the above nature wherein said pivotable biasing head and a conventional erase head may be steppingly and selectively positioned in unison with each other for carrying out a multi-track operation such as stereophonic operation, even though the biasing head is pivotally mounted as described above.

Another object of the invention is to provide a magnetic head arrangement of the above kind having a simple and effective tape guide and pinch roller mechanism which acts in a highly convenient manner in unison with pivotal movement of the biasing head.

Still another object of the invention is to provide a magnetic head arrangement of the kind above referred to, wherein the magnetic tape may be threaded in an undulated passage so as to produce a proper back tension in the tape.

A still further object of the invention is to provide a magnetic head arrangement of the kind above referred to, which is provided with tape guide means for easy threading of the magnetic tape and for positively preventing unwanted disengagement thereof.

A still further object of the invention is to provide a magnetic head arrangement of the above nature wherein a multi-track recording or reproducing operation may be realized in spite of the shiftable arrangement of the H.F. biasing head unit employed.

These and other objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference numerals refer to like parts throughout the several views.

It is to be noted that in the following description the audio-signal head will be expressed by the term record head as an representative example, although such embodiment is not limitative in any way.

Figure 1:
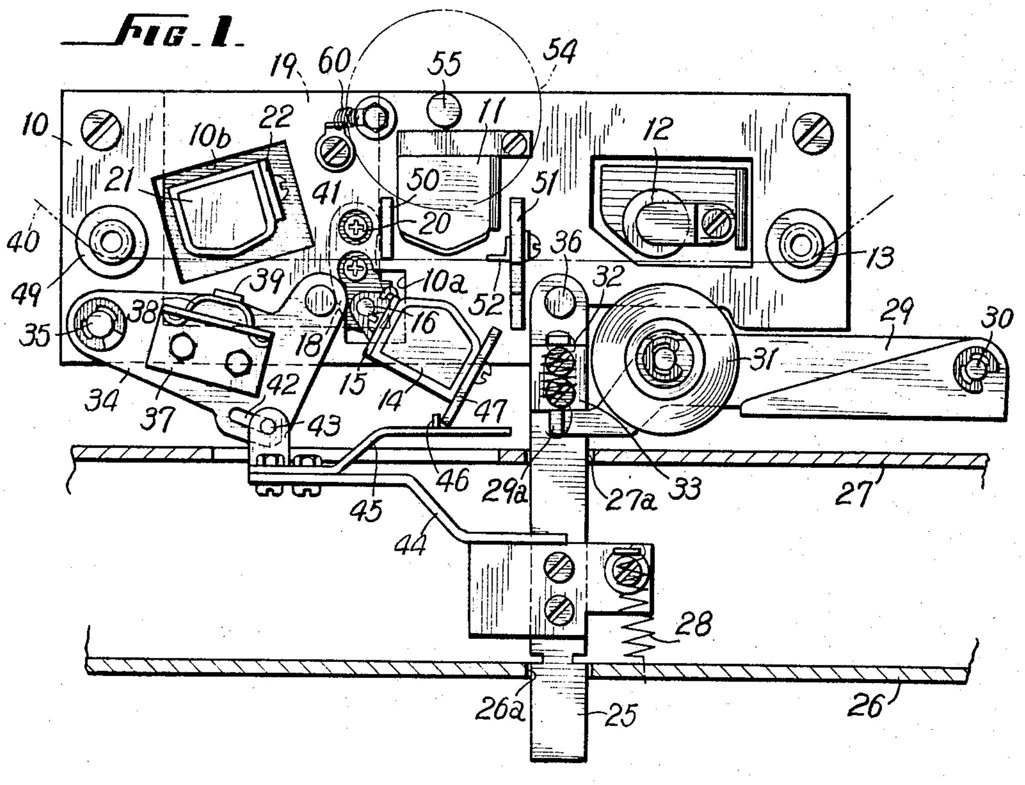
FIG. 1 is a partially sectioned top plan view of essential parts of the novel head arrangement wherein all the included magnetic heads are kept in a non-operative condition.
Figure 2:
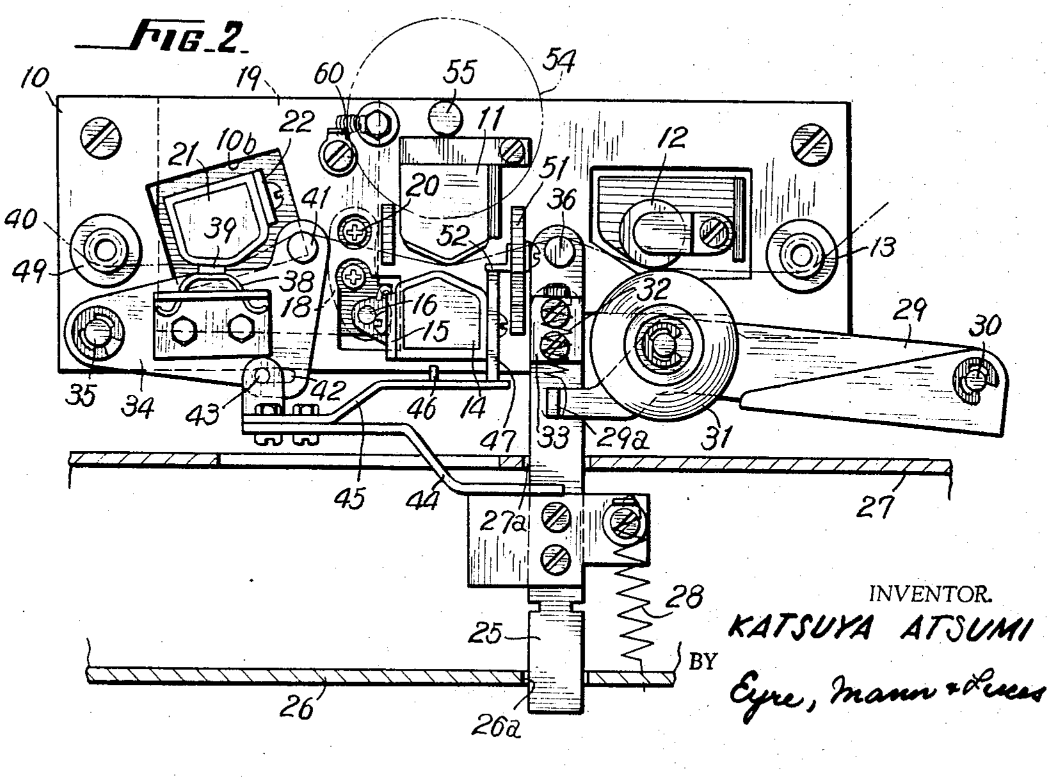
FIG. 2 is a similar view of FIG. 1 wherein, however, the heads are in an operative condition.

Now referring to the accompanying drawings, especially FIGS. 1 and 2 thereof, 10 denotes an upper deck panel of a chassis of a tape recorder which deck is shown for convenience. A conventional multi-track record head 11 is fixedly mounted on panel 10 which is provided further with a conventional capstan 12 and a tape guide post 13 at properly selected distances from the record head along the passage of an elongated magnetic tape which is shown only schematically by a chain-dotted line 40. The capstan is mounted on a vertical shaft for rotation in unison therewith by an electric motor suspended from the bottom surface of the deck panel. Such drive mechanism is however highly familiar to those skilled in the art and thus it has been omitted from the drawings.

A H.F. biasing head 14 is provided substantially in opposition to the record head when viewed in these figures. This head is not stationary, but pivotally movable in a horizontal plane, as well as shiftable vertically for purposes as will be described hereinafter.

An elongated vertical strip 15 is attached fixedly to one side of the biasing head and passes downwards therefrom with considerable play through an opening 10*a* formed in the deck panel. The strip is formed at its lowermost end with a bent-up flange 15*a* in the form of an angle, which flange is pivotally mounted on a support plate 18 through the intermediary of a pin 16 and a sleeve 17, as shown clearly in FIG. 3. Although not shown, the sleeve is made integral with the plate 18 which is adjustably attached to a vertically shiftable carrier by means of two attaching screws. The carrier 19 may be selectively and steppingly positioned to occupy a position parallel to and beneath the panel 10, as will be more fully described hereinafter.

Figures 3, 4:
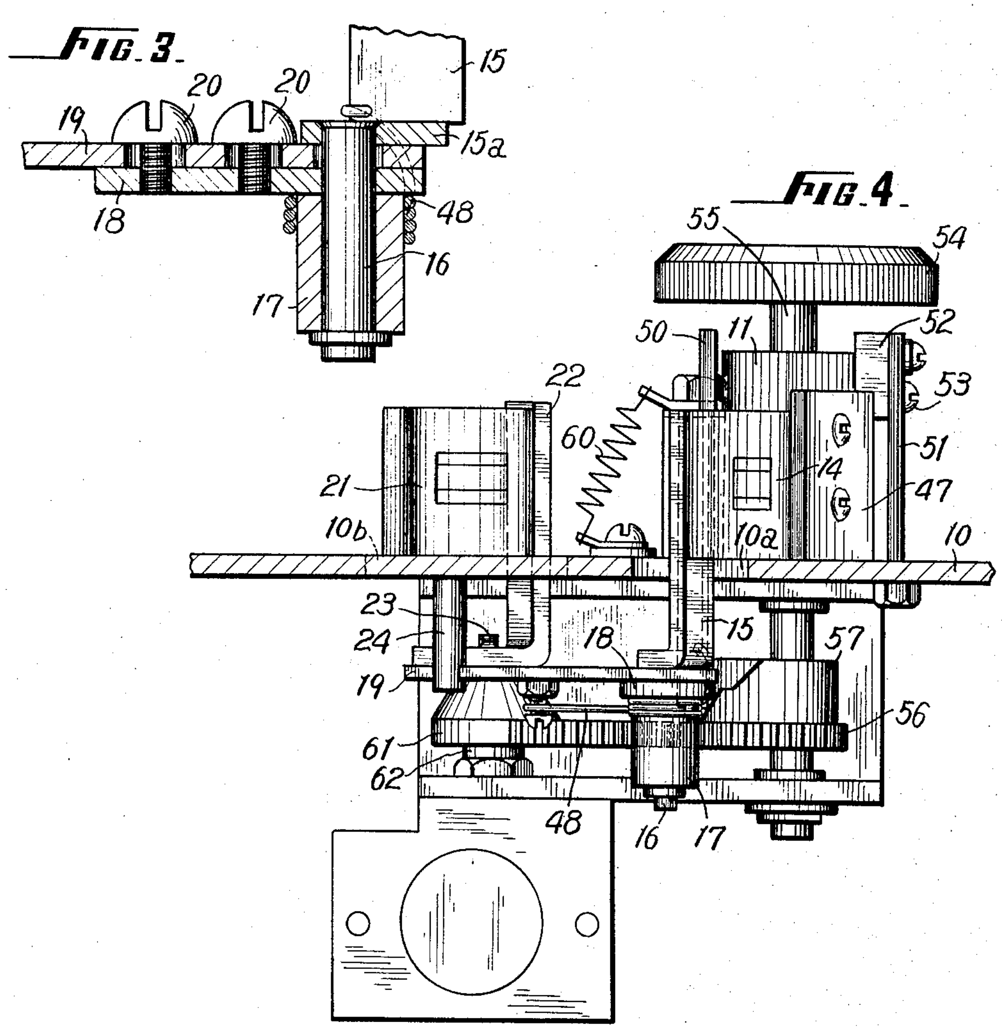
FIG. 3 is a detailed and enlarged vertical section of the pivotal supporting means for the biasing head.
FIGS. 4–6 are side elevational views of a selective and stepping positioning mechanism for the vertical position of the erasing and biasing heads.
Figures 5, 6, 7, 8, 9:
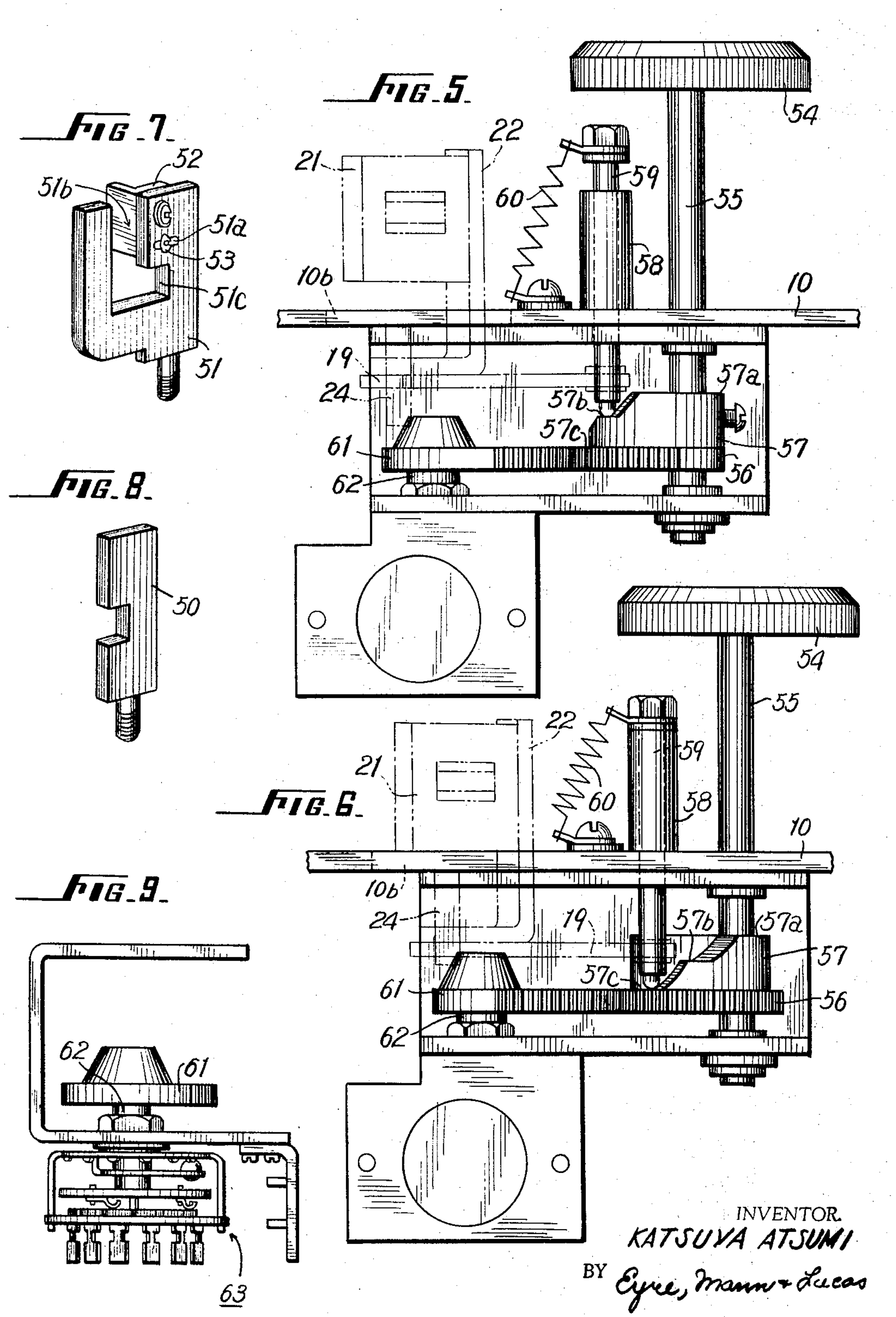
FIGS. 7–8 are perspective views of stationary control tape guide posts.
FIG. 9 is a side elevational view of a rotary switch and its mechanically related parts which are adapted to make switching operations on various electronic and electrical means such as amplifiers, oscillators, magnetic head units and the like, in unison with the above-mentioned stepping control.

21 denotes an erasing head which is fixedly attached at one surface to a vertical strip 22 similar to that denoted 15. The strip 22 passes from upper to lower with considerable play through a further opening 10*b* formed in panel 10, and is formed at its lowermost end with a horizontally directed flange which is fixedly attached to carrier 19 by means of a plurality of fixing screws 23, only one of the latter being seen in FIG. 4. Several pin-and-slot type sliding guide means are provided for stepping control of the selective position of carrier 19, of which, however, only a pin 24 is shown in FIGS. 4–6 as a representative of said sliding guide means for avoiding possible confusion of the drawings.

25 denotes an operating member made in the form of a slide which is slidably guided in openings 26*a* and 27*a* formed in the vertical walls 26 and 27 of a small frame detachably mounted on panel 10. The slide 25 is shiftable from its off-service position shown in FIG. 1 to its operative position shown in FIG. 2 upon manually actuating a control means such as a playing or recording push button, or both. Such control means are highly conventional so that these have been omitted from the drawings. Upon release, the slide will automatically return to its initial position shown in FIG. 1 under the action of a spring 28.

A lever 29 is pivotally mounted on panel 10 by means of a pin 30 studded thereto, mounting rotatably in turn a conventional pressure roller 31 which is adapted to cooperate with capstan 12. The free end 29*a* of the lever is kept in pressure contact with a stop 33 formed integrally on the slide 25, under the influence of a spring 32 so as to maintain the pressure roller separated from the capstan. When the slide 25 is advanced in the aforementioned way, the lever 29 is rotated under the spring action so as to bring the pressure roller into contact with the capstan as shown in FIG. 2. At the front end of slide 25, there is provided a tape guide pin 36 studded to the slide. A further lever 34 is pivotally mounted as at 35 on panel 10 and an angle member 37 is fixedly attached onto the lever 34 by means of set screws. A spring strip 38 is resiliently mounted on the angle member and fitted fixedly with a pressure and wiper pad 39 so as to urge resiliently the tape 40 against the erasing head 21 when the lever 34 is brought into its operative position as shown in FIG. 2. A tape guide pin 41 similar to that denoted 36 is fixedly mounted on the lever 34. At a corner of the lever, there is provided a slot 42 which receives a pin 43 fixedly attached to the free end of an arm 44 extending laterally from the slide 25. Arm 44 is fixedly attached with a spring strip 45 having a stop 46 fixedly mounted thereon. This stop is adapted to cooperate with the side edge of a plate 47 which is fixedly attached on the remote side surface of the biasing head 14 from the attached strip 15.

When the slide 25 is caused to move to its operating forward position shown in FIG. 2, the spring strip 45 advances correspondingly, and thus motion is transmitted therefrom through the slidable engagement between spring strip 45 and plate 47 to the head 14 which is thereby caused to pivot in the clockwise direction in FIG. 1 into its operative position in opposition to, yet separated a small distance from, the record head as shown in FIG. 2. The desired relative operative position between the both heads is positively determined by the engagement of plate 47 with a stationary, yet adjustable stop 52. For this purpose, the stop is attached to a stationary tape guide post 51 studded onto the panel 10. A set screw 51*a* is screwed through a slot 51*a* formed in the post into the stop 52 which is thus adjustably positioned about a pivot screw 100, as shown in FIG. 7.

When the slide 25 returns by spring action as in the aforementioned way, a return spring 48 mounted around sleeve 17 (FIG. 3) acts to urge the biasing head to swivel in the clockwise direction when seen from FIG. 2, thereby bringing the head resiliently into its off-service position as shown in FIG. 1. This retired position is positively kept by the engagement of plate 47 with stop 46.

A tape guide post 49 is studded onto the panel 10 so as to guide the tape 40 at a leading position along the travel passage thereof. This post is so positioned that when seen in the direction of the tape travel, it occupies substantially an opposed position to the final tape guide post 13, and at the same time an outward position separated a distance from erasing head 21. An intermediate tape guide post 50 has a general configuration as shown in FIG. 8 and is mounted on panel 10 leading record head 11 along the forward tape travel path. This post occupies substantially an opposed position relative to that denoted 51 near the record head.

A knob 54 which is shown only schematically in FIGS. 1 and 2, yet shown fully in FIGS. 4 and 5, is provided for positioning the both heads 14 and 21 in a stepwise selected vertical position so as to carry out a multi-track recording or play-back operation, as the case may be. Under the term "multi-track operation" employed herein, the stereophonic recording or reproducing operation is also included, as commonly known to those skilled in the art. The said knob is fixedly attached to a vertical shaft 55 at its uppermost end, said shaft extending vertically downwards from the knob rotatably through panel 10 and being provided fixedly at its lowermost end with both a segmental gear 56 and a three-stepped face cam 57 united into one piece as shown. A guide sleeve 58 is fixedly mounted on panel 10 and receives slidably a pin 59 which passes slidably through the panel. A spring 60 is tensioned between pin 59 and panel 10 so as to urge the pin to move downwardly against any selected step on the cam. For obtaining a smooth engagement with the cam, the pin 59 is formed at its lowermost end with a spherical contact surface. The carriage 10 is fixedly attached to the slide pin in the neighborhood of the lowermost end thereof.

When the knob 54 is manually turned so as to bring the lowermost end of pin 59 into pressure contact with the uppermost operating step 57*a* of the cam, the heads 14 and 21 are brought into their uppermost operating position. In a similar manner, when the knob is so manipulated as to bring the pin 59 into engagement with the intermediate cam step 57*b*, the both heads are also brought into its intermediate operating position (FIG. 5). Finally, when the knob is manipulated so that the follower pin is brought into engagement with the lowermost cam step 57*c* (FIG. 6), the two magnetic heads are positioned in their lowermost operating position.

Upon manual turning of the knob 54, shaft 55 and its segmental gear 56 will be correspondingly rotated so as to turn a meshing segmental gear 61 to a corresponding degree. A shaft 62, shown in FIGS. 5, 6 and 9, is fixed with the latter segmental gear and thus rotates in unison therewith. A multiple rotary switch 63 has its movable parts rigidly connected with the shaft 62 at its lower end, while the stationary switching elements are suspended from the panel 10 by means of a supporting arm 101 (FIG. 9). Thus, upon rotation shaft 62, the switch 63 is switched to a properly selected stage so as to control the electronic elements in the tape recorder. It is however commonly known to any skilled person in the art to provide such rotary switching means, and since such means do not constitute any part of the invention, the details of the switch have been omitted from the drawings.

When the tape recorder operates, the tape is caused to travel from left to right as seen in FIGS. 1 and 2.

In the preparatory stage, the tape 40 is dropped into upwardly directing mouth 51*b* formed in the intermediate guide post 51 and then the corresponding separated zones of the tape are brought to the neighboring areas of the outermost guide posts 13 and 49. It will be clear from the foregoing that the necessary tape-threading operation is thus highly simple and trouble-free. When the threading operation is complete, the tape will occupy a somewhat wavy position slightly deviated from the schematic representation shown by the chain-dotted line 40 in FIG. 1.

When the tape drive control means such as the playing and/or recording control push button is manipulated so as to advance the slide 25 to its forward position, pressure roller 31 and biasing head 14 are brought into their operating position, as was described hereinbefore, and simultaneously, tape guide posts 36 and 41 are also caused to advance to their operating position. In addition, pad 39 is brought into pressure engagement with the acting surface of erasing head 21 through the intermediary of tape 40 under spring action 38.

Under such preparatory conditions, when current is fed to the machine from a suitable power source, not shown, upon switching a main switch means to "on," a recording or reproducing operation may be initiated. It is noted, however, that in the case of the reproducing operation of the machine the biasing head is electrically de-energized by means of a further switching means (not shown).

In the above-mentioned preparatory stage, tape 40 is caused to advance to the bottom wall 51*c* of open channel groove 51*b* and kept in slidable contact therewith, thus unintentional disengagement of the tape from the guide post 51 can be positively prevented and in addition, an accurate and desired positioning of the tape may be assured. As most clearly seen from FIG. 1, the tape has been threaded in an undulating manner such that a proper back tension may be provided to the running tape when the machine operates.

When the slide 25 is released and caused to return to its retired, non-operative position automatically by means of spring 28, and related parts except those to be operated upon by knob 54 are caused to go back to their initial position shown in FIG. 1, the biasing magnetic fluxes emanating from the head 14 will act upon the record head 11 which may be a combined record and play-back head while the biasing head is caused in this case to recede from the latter head as if the H.F. field were gradually diminishing, although the energizing current is in practice not diminished. This phenomenon may be compared definitely with the conventional function of an eraser head for erasing recorded information on a magnetic tape. Thus, possible accumulation of residual magnetization in the record or play-back, or combined head, may be effectively erased without using a separate portable erasing unit which has wide commercial use.

Figure 10A:
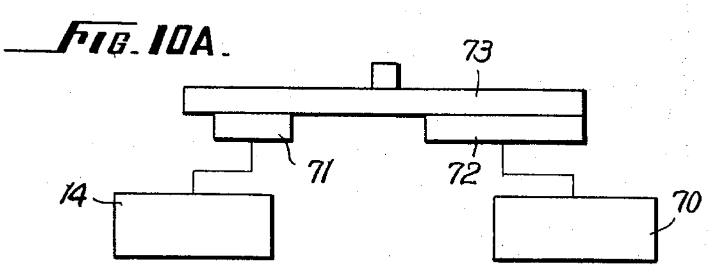
FIGS. 10A and 10B are schematic views of a slider type time lag switch employable in the invention to provide a time lag to de-energization of the biasing head so as to provide to the latter with an efficient means to erase accumulated residual magnetization, if any, in the audio-signal head cooperating with the bias head.
Figure 10B:
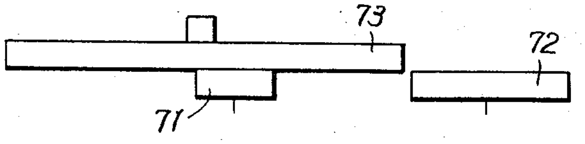

It is thus clear that with use of the present unique and novel magnetic head arrangement, the next recording or play-back operation can be initiated utilizing the optimum magnetic condition of the record or play-back head, or a combination of the two:

For the realization of the above-mentioned mechano-electric erasing action, it is preferable, as shown schematically and by way of example in FIGS. 10A and 10B, to provide stationary contacts 71 and 72, in an electric circuit connecting the biasing head 14 and a conventional oscillator 70 of the tape recorder, and a movable contact 73 adapted to cooperate therewith. The contact 73 is so arranged that it is movable in unison with conventional tape drive control means such as operating slide 25 or any suitable member operatively connected therewith. FIG. 10A shows an operating condition corresponding to the working condition of the heads 11 and 14, wherein the two are brought into their opposed operative relationship as was illustrated hereinbefore. In this case, head 14 is also energized by a H.F. current fed from oscillator 70. Now assume that slide 25 is released and thus recedes. Movable contact 73 is thereby caused to move from right to left in the figure to an intermediate point of its leftward stroke as shown in FIG. 10B so as to break the contacts 71 and 72. Thus, the break is realized with a properly selected time lag counted from the intiation of return movement of slide 25. In this way, the aforementioned erasing effect can be positively obtained. Instead of the slide switch above described, a rotary switch may be employed with equal results. Or instead, a conventional limit switch, a time lag relay or the like may be employed so as to obtain the same results electrically. Although not shown, it is natural that at the commencement of return movement of the biasing head, the record head is electrically shut off by means of a conventional switch.

Although only one embodiment of the invention has been illustrated in the accompanying drawings and described in the foregoing specification, it is to be expressly understood that the invention is not limited thereto in any way. Various changes may also be made in the design and arrangement of the parts without departing from the spirit of the invention and the scope of the appended claims, as the same will now be understood by those skilled in the art.

The invention having thus been described, that which is believed to be new and for which protection by Letters Patent is desired, is:

1. In a magnetic head arrangement of a tape recorder, the improvement comprising a deck panel having mounted thereon an erase head, an audio current head and a bias head, said bias head adapted to cooperate with said audio current head; mechanical positioning means mounted on said panel for selectively and pivotally positioning said bias head between a receded off-service position and an advanced on-service position, said bias head when in the on-service position being opposite said audio control head at a predetermined distance therefrom, and when in the off-service position being at a greater distance therefrom, means for resiliently urging said bias head to remain normally in its off-service position, said positioning means including a manually operable slide bar having an extension attached thereto, said extension having an abutting surface in contact with an opposed abutting surface on the said bias head, said abutting surfaces being slidable relative to each other and being effective to translate said slidable movement into pivotal movement of said bias head between said off-service and on-service positions, said pivotal movement between said on-service and off-service positions being terminated by mechanical stop means fixedly attached to said panel; switch means connected to said positioning mechanism and operable in response to movement thereof for maintaining said bias head energized during some portion of the movement of said positioning mechanism from said on-service to said off-service position, whereby residual magnetization in the audio current head is minimized.

2. Magnetic head arrangement as set forth in claim 1, wherein a rotatable capstan and a pressure roller adapted to cooperate therewith are provided, said roller being pivotally mounted on said panel so as to move in unison with said biasing head.

3. Magnetic head arrangement as set forth in claim 1 wherein said slide bar extension includes an abutting stop fixedly mounted on said extension, said abutting stop being effective to terminate pivotal movement of the bias head between said on-esrvice and off-service positions.

4. Magnetic head arrangement as set forth in claim 3 wherein said slide bar extension further includes a plurality of members fixedly interconnected, at least one of said members being resilient and adapted to slidably cooperate with said abutting surface on said bias head.

5. Magnetic head arrangement as set forth in claim 1, wherein said audio current head is a multi-track audio current head and further comprising: a manual knob, a shaft attached fixedly therewith and mounted turnably in said panel, a stepped cam fixedly connected with said knob shaft, a follower pin slidably mounted in said panel and kept in engagement with the stepped cam surfaces on said cam, said follower pin being operatively connected with said mechanical means for selectively positioning said erase and said biasing head vertically.

6. Magnetic head arrangement as set forth in claim 5, wherein second switching means are mounted on said knob shaft for switching electronic components in said tape recorder in unison with the vertical movement of said bias head.

7. Magnetic head arrangement as set forth in claim 1, wherein shiftable tape guide means are provided which are fixedly mounted on said mechanical means for cooperation with a plurality of stationary tape guide means fixedly mounted on said panel for positioning a magnetic tape in an undulated passage way.

8. Magnetic head arrangement as set forth in claim 7, wherein said shiftable tape guide means are guide posts adapted to move in unison with said biasing head.

9. Magnetic head arrangement as set forth in claim 7, wherein a pad is provided and mounted shiftably on said panel, said pad being shiftable in unison with movement of said biasing head so as to move between its off-service position and its cooperative position with said erase head.

References Cited

UNITED STATES PATENTS

| | | | |
|---|---|---|---|
| 2,538,893 | 1/1951 | Begun | 179—100.2 |
| 2,675,429 | 4/1954 | Rohling | 179—100.2 |
| 2,719,884 | 10/1955 | Reed et al. | 179—100.2 |
| 2,733,300 | 1/1956 | Menard | 179—100.2 |
| 2,854,524 | 9/1958 | Went et al. | 179—100.2 |
| 2,898,113 | 8/1959 | Namenyi-Katz | 179—100.2 |
| 2,958,736 | 11/1960 | Akai | 179—100.2 |
| 3,050,225 | 8/1962 | Ulman | 179—100.2 |
| 3,271,034 | 9/1966 | Andrews | 179—100.2 |

FOREIGN PATENTS

| | | |
|---|---|---|
| 925,318 | 3/1955 | Germany. |
| 1,032,565 | 6/1958 | Germany. |
| 842,694 | 7/1960 | Great Britain. |
| 1,279,007 | 11/1961 | France. |

TERRELL W. FEARS, *Primary Examiner.*

BERNARD KONICK, *Examiner.*

L. G. KURLAND, J. R. GOUDEAU, *Assistant Examiners.*